United States Patent
Hjelmvik

(10) Patent No.: US 8,333,318 B2
(45) Date of Patent: Dec. 18, 2012

(54) METHOD FOR PAYMENT WHEN PARKING VEHICLES IN WHICH A CREDIT CARD IS USED FOR POST-PAYMENT

(75) Inventor: Torbernt Hjelmvik, Järfälla (SE)

(73) Assignee: Modul-System Sweden AB, Jarfalla (SE)

( * ) Notice: Subject to any disclaimer, the term of this patent is extended or adjusted under 35 U.S.C. 154(b) by 149 days.

(21) Appl. No.: 13/059,286

(22) PCT Filed: Sep. 1, 2009

(86) PCT No.: PCT/SE2009/050986
§ 371 (c)(1),
(2), (4) Date: Mar. 15, 2011

(87) PCT Pub. No.: WO2010/027318
PCT Pub. Date: Mar. 11, 2010

(65) Prior Publication Data
US 2011/0192897 A1    Aug. 11, 2011

(30) Foreign Application Priority Data
Sep. 5, 2008 (SE) ........................ 0801912

(51) Int. Cl.
*G06K 5/00* (2006.01)

(52) U.S. Cl. ..................................... 235/380

(58) Field of Classification Search .......... 235/375, 235/380, 384, 487; 705/13, 418
See application file for complete search history.

(56) References Cited

U.S. PATENT DOCUMENTS

| | | | |
|---|---|---|---|
| 6,832,206 B1 * | 12/2004 | Chelnik | ............................ 705/13 |
| 7,424,968 B2 * | 9/2008 | Meyerhofer et al. | .......... 235/375 |
| 2004/0068433 A1 | 4/2004 | Chatterjee et al. | |
| 2007/0112621 A1 * | 5/2007 | Miller et al. | ..................... 705/13 |

FOREIGN PATENT DOCUMENTS

| | | | |
|---|---|---|---|
| GB | 2241368 A | | 8/1991 |
| JP | 05298511 A | * | 11/1993 |
| WO | 9735283 A1 | | 9/1997 |
| WO | 0041142 A1 | | 7/2000 |
| WO | 0152195 A1 | | 7/2001 |

OTHER PUBLICATIONS

International Search Report, dated Dec. 1, 2009, from corresponding PCT application.

* cited by examiner

*Primary Examiner* — Seung Lee
(74) *Attorney, Agent, or Firm* — Young & Thompson

(57) ABSTRACT

A payment method when parking vehicles in which a credit or debit card is used for post-payment, which system includes a number of parking machines provided with credit or debit card readers, which parking machines are connected to a supervisory computer system including a computer and a database, where a credit or debit card is read by the card reader at the commencement and termination of the parking period. The registration number of the vehicle is input into the parking machine by the person parking the vehicle, using elements associated with the parking machine, the number of the credit or debit card and the registration number are transferred to the computer and stored and associated with each other in the database, when the card is read at the commencement of a subsequent parking period and when the number of the credit card or debit card is received by the computer, the computer system retrieves at least the registration number with which the credit or debit card most recently associated in the database.

14 Claims, 1 Drawing Sheet

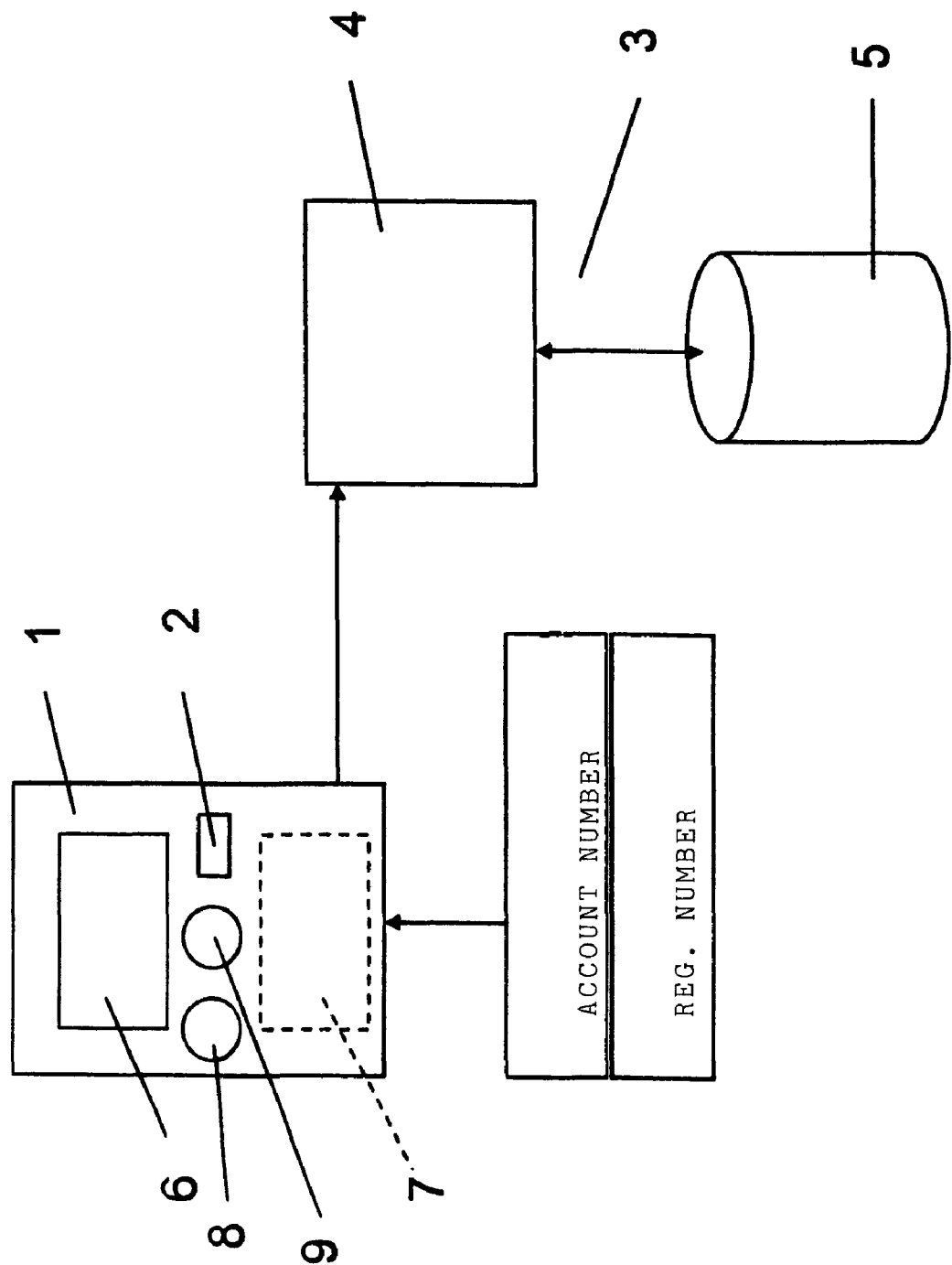

METHOD FOR PAYMENT WHEN PARKING VEHICLES IN WHICH A CREDIT CARD IS USED FOR POST-PAYMENT

The present invention concerns a method for payment when parking vehicles in which a credit card or debit card is used for post-payment.

Payment systems for vehicle parking are available in which a person reads a credit card or debit card by means of a parking machine at the commencement of the parking period and receives a ticket, which is then placed on the dashboard of the vehicle. The same credit card or debit card is read in a parking machine belonging to the system at the end of the parking period, whereby the parking fee is calculated and the account that is associated with the credit card or debit card is charged. It is thus not pertinent that the parking system has information about any vehicle code, since checking is carried out using the said ticket. Such a system has the disadvantage that the parking machine must be continually maintained, through the supply of new paper for tickets.

Also parking payment systems are available in which the registration number of the vehicle is input into the parking machine when the parking period commences, instead of a ticket being printed when the parking period commences. The parking period is commenced by the reading of a credit card or debit card by the parking machine. The parking period is ended by a further reading of the credit card or debit card by a parking machine that belongs to the system. A list of parked vehicles can be generated in order to check whether a vehicle has begun a parking period, since the registration number of each vehicle has been fed into the system.

Both of the parking payment systems described above are post-payment systems.

The latter system has the disadvantage that a person who parks a vehicle must on each occasion that this occurs input the registration number, something that is experienced as time-consuming, particularly when a queue to the parking machine has formed.

The present invention removes this disadvantage.

The present invention thus concerns a method for payment when parking vehicles in which a credit card or debit card is used for post-payment, which system comprises a number of parking machines provided with credit card or debit card readers, which parking machines are connected to a supervisory computer system comprising a computer and a database, where a credit card or debit card is caused to be read by means of the parking machine at the commencement of a parking period, as also at the end of the parking period, and it is characterised in that the registration number of the vehicle is caused to be input into the parking machine by the person who is parking the vehicle, using means that are associated with the parking machine, in that the number of the credit card or debit card and the registration number are caused to be transferred to the said computer and caused to be stored associated with each other in the said database, in that when the said credit card or debit card is read at the commencement of a subsequent parking period and when the number of the credit card or debit card is received by the said computer the computer system is caused to retrieve at least the registration number with which the said credit card or debit card was most recently associated in the database, in that the computer system is caused to transfer the said registration number to the parking machine, and in that the parking machine is caused to display the registration number on a display that is associated with the parking machine together with a question concerning whether the person parking the vehicle is to park the vehicle that has the specified registration number or not, and in that the person is caused to input the answer to this question using the said means.

The invention is described in more detail below, partially in association with an embodiment of the invention illustrated in the attached drawing, where FIG. 1 shows a block diagram that illustrates the invention.

The present invention concerns a method for payment when parking vehicles, in which method a credit card or debit card is used for post-payment, and which system comprises a number of parking machines 1 provided with readers 2 for credit cards or debit cards. The parking machines 1 are connected to a supervisory computer system 3 comprising a computer 4 and a database 5, where a credit card or debit card is caused to be read by means of the credit card or debit card reader of the parking machine at the commencement of a parking period, as also at the end of the parking period.

According to the invention, the registration number of the vehicle is caused to be input into the parking machine 1 by the person who is parking the vehicle, using means that are associated with the parking machine.

According to one preferred embodiment, the said means comprise an electronic touch-sensitive screen 6 with alphanumerical characters.

According to an alternative design, the said means comprise a keyboard 7 with alphanumerical characters. The keyboard 7 is denoted using dashed lines in FIG. 1.

According to one highly preferred design, the parking machine is provided with a microphone 8, where the microphone is connected to a suitable known circuit for voice recognition, not shown in the drawings, in the parking machine 1. The parking machine is caused to recognise a registration number, which is pronounced by the person parking the vehicle after the credit card or debit card has been read by the parking machine. The said circuit is subsequently caused to control a loudspeaker 9 such that it repeats the registration number to the person parking the vehicle, using synthetic speech. Alternatively, the said circuit is caused to control a display 6 on which the recognised registration number is displayed. The time required for logging in a vehicle is further reduced by means of this design.

Furthermore, according to the invention, the number of the credit card or debit card and the registration number are caused to be transferred to the said computer 4 and caused to be stored associated with each other in the said database 5.

When the said credit card or debit card is read at the commencement of a subsequent parking period and when the number of the credit card or debit card is received by the said computer 4, the computer system 3 is caused to retrieve at least the registration number with which the said credit card or debit card was most recently associated in the database 5, whereby the computer system is caused to transfer the said registration number to the parking machine 1, which is caused to display the registration number on a display 6 that is associated with the parking machine together with a question concerning whether the person parking the vehicle is to park the vehicle that has the specified registration number or not. The said display may be the said alphanumerical touch-sensitive screen. Finally, the person is caused to input the answer to this question using the said means 6, 7.

In the case in which the person parking the vehicle wishes to park a vehicle with a different registration number, the person parking the vehicle answers "No" and inputs the registration number of the vehicle that is to be parked.

According to one preferred design, the computer system 3 is caused to transfer to the parking machine 1 at least the two most recent registration numbers that have been stored in the database 5 together with the account number of the said credit card or debit card, after which selection of the registration number is caused to be input into the parking machine by the person parking the vehicle. In the case in which the parking machine is provided with the said touch-sensitive screen 6, the registration numbers are displayed on the screen, whereby the person parking the vehicle touches the registration number that is to be used.

It is obvious that more registration numbers than the most recent two can be specified on the touch-sensitive screen.

When the parking period is at an end, the person parking the vehicle once again causes the credit card or debit card to be read in the credit card or debit card reader of the parking machine. The computer system hereby calculates the parking fee and transmits a debit instruction to the relevant credit card or debit card company.

In order to check the parked vehicles, the said computer system 3 is caused to specify which registration numbers have been registered in the said database 5 for parking and which have not terminated the period of parking.

A parking officer can thus produce a list of vehicles that are registered to be present in the parking location, such that it is possible to check using this list whether parked vehicles have been logged into the system or not. An alternative method is one in which the parking officer has wireless communication with the computer system 3. One way in which to use wireless connection is that the parking officer transmits by a suitable method information concerning a vehicle to the computer system, whereby the computer system transmits to the parking officer information about whether the vehicle has been logged into the system.

A further way is that the registration numbers of vehicles within a certain area are read by machine, after which the registration numbers that have been read are transferred to the computer system and there compared with those vehicles that have been logged into the system. In the case in which a certain vehicle is present in the area without having been logged into the computer system, the computer system generates a parking penalty.

The present invention removes the disadvantages described in the introduction. The present system means that logging in takes place more rapidly since it is sufficient in the normal case to read the credit card or debit card, and since the management of tickets and similar is eliminated.

A number of different embodiments have been described above. It is, however, obvious that the invention can be varied with respect to the properties of the parking machine, and with respect to how the check of parked vehicles is carried out.

The input arrangement for registration numbers, for example, can be other than those specified above. The keyboard may be of the same type as the keyboard used on a mobile telephone, i.e. one in which the numerical keys are used also as letter keys. A further design is one in which the display is a display with one field for the registration number, comprising three locations for letters and three locations for numbers. When the credit card or debit card has been read, the said fields are activated and the letter "A" is displayed in the first location. In the case in which a different letter is to be placed in the first location, the person parking the vehicle presses an arrow key such that the letters B, C, D, . . . are displayed. A cursor is moved to the next position once the person parking the vehicle has confirmed the correct character using a key, and so on.

Thus, the present invention is not to be considered to be limited to the embodiments specified above, since it can be varied within the scope specified by the attached patent claims.

The invention claimed is:

1. A method for payment when parking vehicles in which a credit card or debit card is used for post-payment, which system comprises a number of parking machines (1) provided with credit card or debit card readers (2), which parking machines are connected to a supervisory computer system (3) comprising a computer (4) and a database (5), where a credit card or debit card is caused to be read by means of the credit card or debit card reader (2) of the parking machine at the commencement of a parking period, as also at the end of the parking period, characterised in that the registration number of the vehicle is caused to be input into the parking machine (1) by the person who is parking the vehicle, using means (6, 7) that are associated with the parking machine, in that the number of the credit card or debit card and the registration number are caused to be transferred to the said computer (4) and caused to be stored associated with each other in the said database (5), in that when the said credit card or debit card is read at the commencement of a subsequent parking period and when the number of the credit card or debit card is received by the said computer (4) the computer system (3) is caused to retrieve at least the registration number with which the said credit card or debit card was most recently associated in the database (5), in that the computer system (3) is caused to transfer this registration number to the parking machine (1) and in that the parking machine is caused to display the registration number on a display (6) that is associated with the parking machine together with a question concerning whether the person parking the vehicle is to park the vehicle that has the specified registration number or not, and in that the person is caused to input the answer to the question into the parking machine (1) using the said means (6, 7).

2. The method according to claim 1, characterised in that the computer system (3) is caused to transfer to the parking machine (1) at least the two most recent registration numbers that have been stored in the database (5) together with the account number of the said credit card or debit card, and in that a selection of the registration number is caused to be input into the parking machine by the person parking the vehicle.

3. The method according to claim 2, characterised in that the said means comprise an electronic touch-sensitive screen (6) with alphanumerical characters.

4. The method according to claim 2, characterised in that the said means comprise a keyboard (7) with alphanumerical characters.

5. The method according to claim 2, characterised in that the parking machine is provided with a microphone (8), where the microphone is connected to a suitable known circuit for voice recognition in the parking machine (1), in that the parking machine is caused to recognise a registration number, which is pronounced by the person parking the vehicle after the credit card or debit card has been read by the parking machine, and in that the said circuit is caused to control a loudspeaker (9) such that it repeats the registration number to the person parking the vehicle, using synthetic speech, or alternatively, caused to control a display (6) on which the recognised registration number is displayed.

6. The method according to claim 2, characterised in that the said computer system (3) is caused to specify which registration numbers have been registered in the said database (5) for parking but which have not terminated the period of parking.

7. The method according to claim 1, characterised in that the said means comprise an electronic touch-sensitive screen (6) with alphanumerical characters.

8. The method according to claim 7, characterised in that the said means comprise a keyboard (7) with alphanumerical characters.

9. The method according to claim 7, characterised in that the said computer system (3) is caused to specify which registration numbers have been registered in the said database (5) for parking but which have not terminated the period of parking.

10. The method according to claim 1, characterised in that the said means comprise a keyboard (7) with alphanumerical characters.

11. The method according to claim 10, characterised in that the said computer system (3) is caused to specify which registration numbers have been registered in the said database (5) for parking but which have not terminated the period of parking.

12. The method according to claim 1, characterised in that the parking machine is provided with a microphone (8), where the microphone is connected to a suitable known circuit for voice recognition in the parking machine (1), in that the parking machine is caused to recognise a registration number, which is pronounced by the person parking the vehicle after the credit card or debit card has been read by the parking machine, and in that the said circuit is caused to control a loudspeaker (9) such that it repeats the registration number to the person parking the vehicle, using synthetic speech, or alternatively, caused to control a display (6) on which the recognised registration number is displayed.

13. The method according to claim 12, characterised in that the said computer system (3) is caused to specify which registration numbers have been registered in the said database (5) for parking but which have not terminated the period of parking.

14. The method according to claim 1, characterised in that the said computer system (3) is caused to specify which registration numbers have been registered in the said database (5) for parking but which have not terminated the period of parking.

* * * * *